United States Patent
Kim

(10) Patent No.: US 7,991,395 B2
(45) Date of Patent: Aug. 2, 2011

(54) APPARATUS AND METHOD FOR SCANNING FREQUENCY IN MOBILE TERMINAL

(75) Inventor: Yu-Shin Kim, Osan-si (KR)

(73) Assignee: Samsung Electronics Co., Ltd (KR)

( * ) Notice: Subject to any disclaimer, the term of this patent is extended or adjusted under 35 U.S.C. 154(b) by 894 days.

(21) Appl. No.: 11/871,655

(22) Filed: Oct. 12, 2007

(65) Prior Publication Data

US 2008/0096554 A1   Apr. 24, 2008

(30) Foreign Application Priority Data

Oct. 20, 2006   (KR) ........................ 10-2006-0102402

(51) Int. Cl.
*H04Q 7/20* (2006.01)
(52) U.S. Cl. ........................................ 455/434; 370/333
(58) Field of Classification Search .................. None
See application file for complete search history.

(56) References Cited

U.S. PATENT DOCUMENTS

2004/0203839 A1 * 10/2004 Ostberg et al. ................ 455/455

FOREIGN PATENT DOCUMENTS

| KR | 1020060024218 | 3/2006 |
| KR | 1020060083755 | 7/2006 |

* cited by examiner

*Primary Examiner* — Phuoc Doan
(74) *Attorney, Agent, or Firm* — The Farrell Law Firm, P.C.

(57) ABSTRACT

Provided is an apparatus and method for scanning a frequency in a mobile terminal. The apparatus includes a frequency scanner that detects an available frequency in such a manner that a Last-used frequency Band (LB) in which a last frequency used is included is first scanned when a frequency-scanning event is generated and thereafter the LB is periodically re-scanned while the entire frequency bands are scanned.

8 Claims, 4 Drawing Sheets

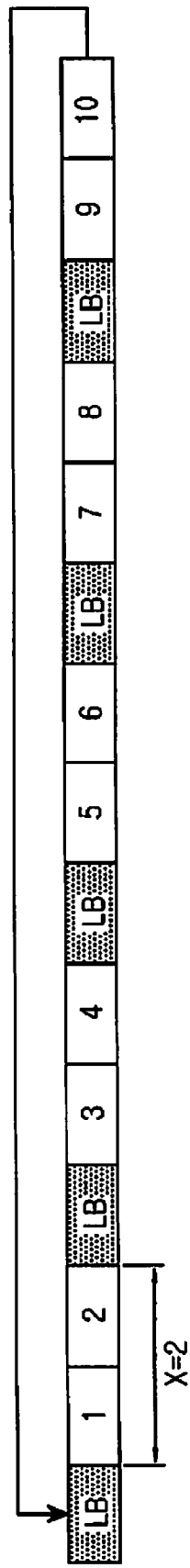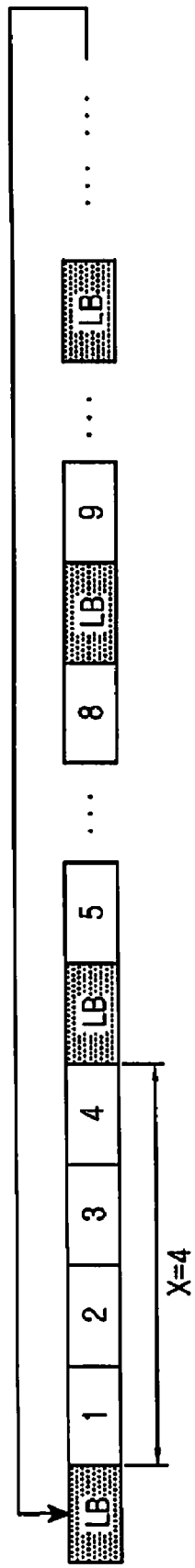

APPARATUS AND METHOD FOR SCANNING FREQUENCY IN MOBILE TERMINAL

PRIORITY

This application claims priority under 35 U.S.C. §119(a) to an application filed in the Korean Intellectual Property Office on Oct. 20, 2006 and assigned Serial No. 2006-102402, the contents of which are incorporated herein by reference.

BACKGROUND OF THE INVENTION

1. Field of the Invention

The present invention relates to an apparatus and method for scanning a frequency in a mobile terminal, and more particularly, to an apparatus and method for scanning a frequency in which a last-used frequency band is periodically re-scanned when a mobile terminal loses a signal and thus scans frequency bands.

2. Description of the Related Art

Recently, portable terminals such as a mobile terminal or a Personal Digital Assistant (PDA) are widely used. Usage of portable terminals is becoming widespread, ranging from simple telephone calls and scheduling to capturing images or videos with a built-in digital camera, watching satellite broadcasts, text editing, playing games, navigating, listening to music, sending short messages, and communicating through multimedia messages capable of transmitting/receiving captured images or videos.

In such a portable terminal, using a certain frequency to transmit/receive signals provides telephone call services and message services. In general, when the portable terminal is turned on, frequency bands are scanned, starting from a frequency band in which a pre-stored frequency exists, and when a signal is lost, as shown in FIG. 1, frequency-scanning is sequentially carried out starting from a last-used frequency band.

FIG. 1 illustrates a scan order of frequency bands when the conventional mobile terminal carries out frequency-scanning. Referring to FIG. 1, a mobile telecommunication system is composed of ten frequency bands. When the mobile terminal loses a service, frequency-scanning is carried out such that a Last-used frequency Band (LB) is first scanned, and thereafter the rest of frequency bands are sequentially scanned.

However, in a case of a mobile terminal using a frequency band with a wide bandwidth for each channel, scanning one frequency band after another is a time consuming process. Examples of such case in which this problem occurs include Wideband Code Division Multiple Access (WCDMA), Orthogonal Frequency Division Multiplexing (OFDM), Wireless Broadcasting (WiBro), and Digital Video Broadcasting (DVB).

In general, operators, who provide the mobile telecommunication systems, each use only a specific bandwidth. When a frequency being used is lost due to an Out-Of-Coverage (OOC) situation or other similar situations, the mobile terminal first scans the LB, and, if no available frequency is detected as a result, the mobile terminal sequentially scans an entire set of frequency bands. However, since each operator uses a different frequency band, scanning of the set entire of frequency bands is equivalent to scanning less usable frequency bands. Accordingly, the wideband mobile telecommunication system may suffer from a significant time delay.

SUMMARY OF THE INVENTION

The present invention provides a frequency-scanning apparatus and method of a mobile terminal.

The present invention also provides a frequency-scanning apparatus and method in which a last-used frequency band is periodically re-scanned when a mobile terminal scans frequency bands.

According to one aspect of the present invention, there is provided a frequency-scanning apparatus of a mobile terminal, including a frequency scanner that detects an available frequency in such a manner that a Last-used frequency Band (LB) in which a last frequency used is included is first scanned when a frequency-scanning event is generated and thereafter the LB is periodically re-scanned while an entire set of frequency bands are scanned.

According to another aspect of the present invention, there is provided a frequency-scanning method of a mobile terminal, which includes (1) checking a Last-used frequency Band (LB) when a frequency scanning event is generated; (2) searching for an available frequency from the LB; (3) if no available frequency is detected from the LB, sequentially selecting other frequency bands; (4) searching for an available frequency from the selected frequency bands; (5) if no available frequency is detected from the selected frequency bands, determining whether a predetermined period of time for re-scanning the LB has elapsed; and (6) if the predetermined period of time for re-scanning the LB has elapsed, returning back to step (2) and repeating steps (2) to (6) until the available frequency is detected.

BRIEF DESCRIPTION OF THE DRAWINGS

The above and other objects, features and advantages of the present invention will become more apparent from the following detailed description when taken in conjunction with the accompanying drawings in which:

FIGS. 3A and 3B illustrate a scan order of frequency bands when frequency-scanning is carried out by a mobile terminal according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a frequency-scanning apparatus and method capable of reducing a frequency scan time, whereby a Last-used frequency Band (LB) is periodically re-scanned while frequency-scanning is carried out by a mobile terminal. The present invention will be described hereinafter with reference to the accompanying drawings.

Figure 1:
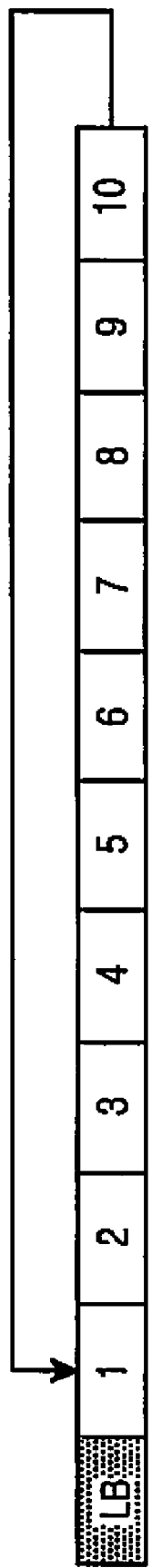
FIG. 1 illustrates a scan order of frequency bands when frequency-scanning is carried out by the conventional mobile terminal.
Figure 2:
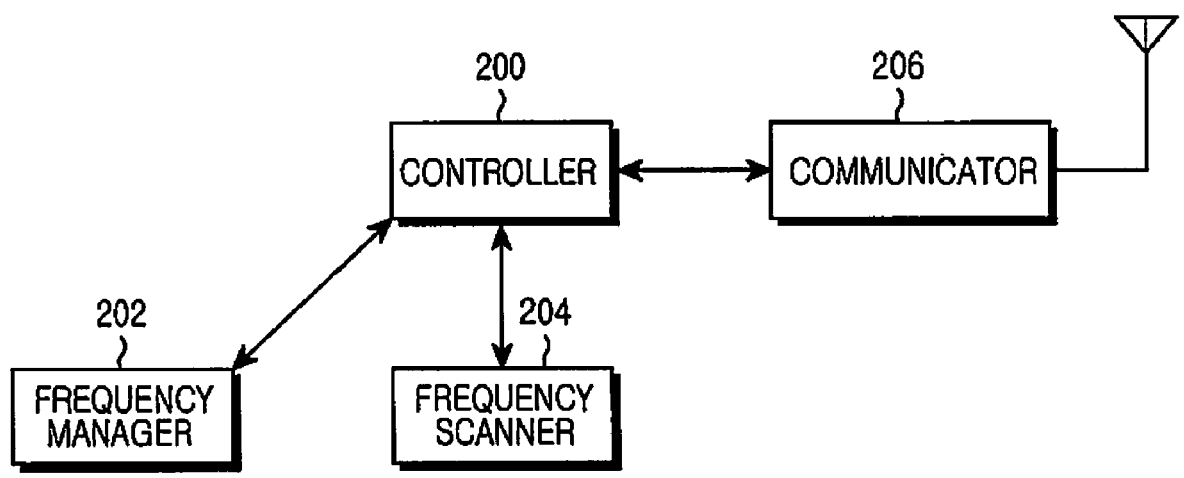
FIG. 2 is a block diagram of a frequency-scanning apparatus of a mobile terminal according to the present invention.

FIG. 2 is a block diagram of a frequency-scanning apparatus of a mobile terminal according to the present invention. Referring to FIG. 2, the frequency-scanning apparatus includes a controller 200, a frequency manager 202, a frequency scanner 204, and a communicator 206.

The communicator 206 transmits/receives packet data as well as a voice signal for a circuit service. In this case, in a receiving process, a frequency of a Radio Frequency (RF) signal received trough an antenna is decreased, and then the received signal is de-spread and channel-decoded. In addition, in the transmitting process, the received signal is channel-coded and spread, and then the frequency thereof is increased for transmission through the antenna.

When a frequency being used is modified, the frequency manager 202 stores a LB in which a last frequency used is included.

During frequency-scanning, the frequency scanner 204 checks the LB by using the frequency manager 202. If an available frequency is detected from the LB, the available frequency is provided to the controller 200. Otherwise, next frequency bands are sequentially selected for scanning. In this case, while frequency bands other than the LB are scanned, the frequency scanner 204 periodically re-scans the LB.

FIGS. 3A and 3B illustrate a scan order of frequency bands when frequency-scanning is carried out by a mobile terminal according to the present invention. Referring to FIGS. 3A and 3B, an LB is re-scanned with a specific period 'x', where the period x equals 2 in FIG. 3A and 4 in FIG. 3B.

The controller 200 controls the frequency manager 202 and the frequency scanner 204. That is, the controller 200 may perform functions of the frequency manager 202 and the frequency scanner 204. Although these components are separately constructed in the present invention, this construction is only for explaining the components' functions distinctively. Therefore, in practice, all of these components may be processed by the controller 200, or only a part of these components may be processed by the controller 200.

Now, a frequency-scanning method of a mobile terminal having the aforementioned structure will be described with reference to the accompanying drawings.

Figure 4:
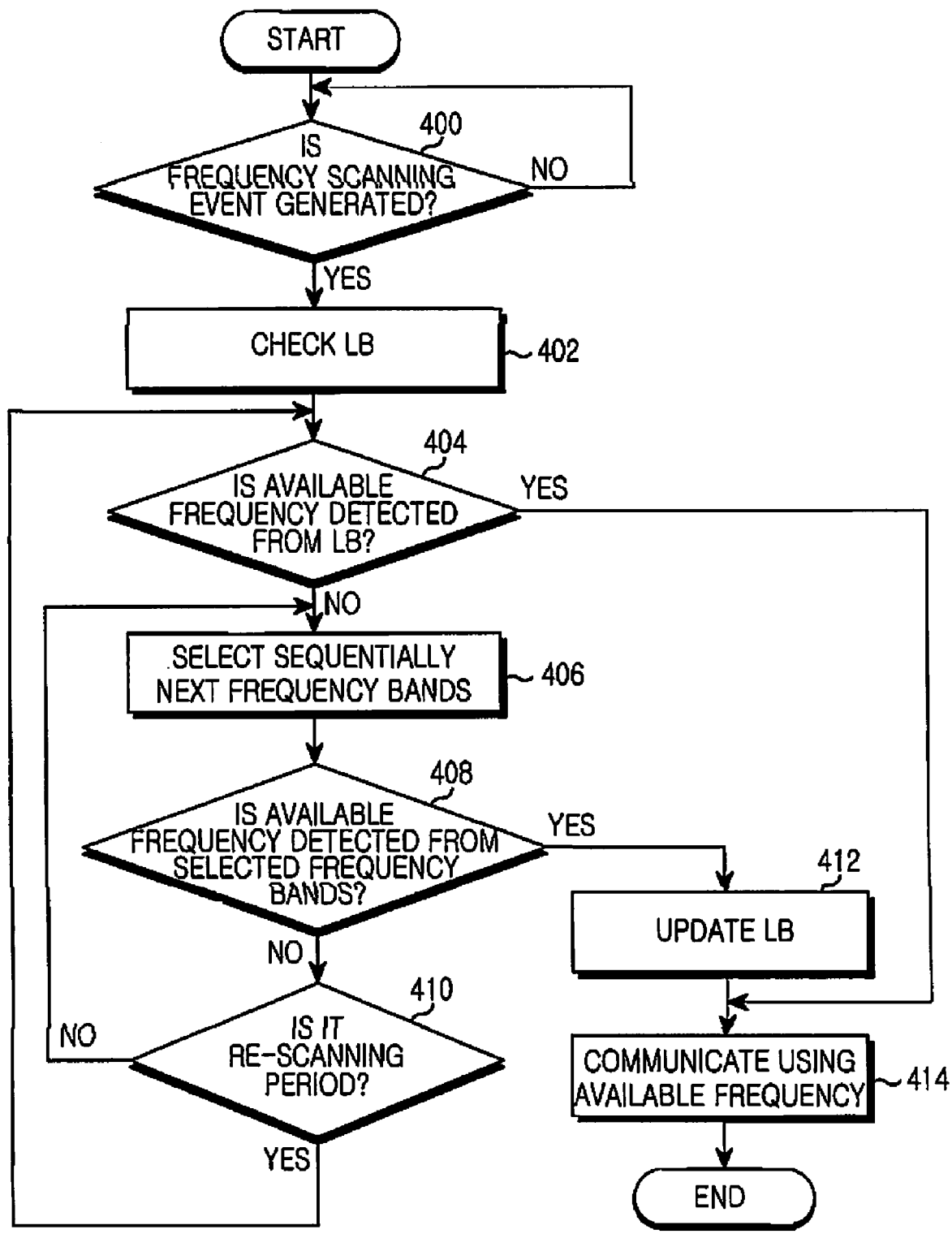
FIG. 4 is a flowchart of a frequency-scanning method of a mobile terminal according to the present invention.

FIG. 4 is a flowchart of a frequency-scanning method of a mobile terminal according to the present invention.

Referring to FIG. 4, it is checked whether a frequency-scanning event is generated, in step 400. Then, an LB is checked, in step 402. Then, an available frequency is detected from the LB, in step 404. As a result of step 404, if the available frequency is detected from the LB, communication is established using the available frequency, in step 414.

However, as a result of step 404, if no available frequency is detected from the LB, next frequency bands are sequentially selected, in step 406. Then, an available frequency is detected from the selected frequency bands, in step 408. As a result of step 408, if the available frequency is detected from the selected frequency bands, the LB is updated, in step 412. Then, communication is established using the available frequency, in step 414.

However, as a result of step 408, if no available frequency is detected from the LB, it is determined if it is a period for re-scanning the LB, in step 410. As a result of step 410, if it is not the period for re-scanning the LB, the procedure returns to step 406, and the aforementioned steps are repeated until an available frequency is found.

On the other hand, as a result of step 410, if it is the period for re-scanning the LB, the procedure returns to step 404, and the aforementioned steps are repeated until the available frequency is found.

According to the present invention, when frequency-scanning is carried out for a mobile terminal, an available frequency is detected in such a manner that an LB is first scanned and thereafter is periodically re-scanned while the entire frequency bands are scanned. Advantageously, therefore, frequency-scanning can be relatively rapidly achieved in a mobile telecommunication system environment where each operator uses a specific frequency band.

Alternate embodiments of the present invention can also comprise computer readable codes on a computer readable medium. The computer readable medium includes any data storage device that can store data that can be read by a computer system. Examples of a computer readable medium include magnetic storage media (such as a Read Only Memory (ROM), floppy disks, and hard disks, etc.), and optical recording media (such as Compact Disc (CD)-ROMs or Digital Versatile Discs (DVDs)). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for scanning a frequency in a mobile terminal, comprising:
    a frequency scanner that detects an available frequency in such a manner that when a frequency-scanning event is generated, a Last-used frequency Band (LB), in which a last frequency used is included, is first scanned, and thereafter the LB is periodically re-scanned while the entire frequency bands are scanned,
    wherein the frequency scanner checks the LB when the frequency-scanning event is generated, and the available frequency is searched from the LB,
    wherein, if no available frequency is detected from the LB, sequentially selecting other frequency bands, and an available frequency is searched from the selected frequency bands,
    wherein, if no available frequency is detected from the selected frequency bands, determining whether a predetermined period of time for re-scanning the LB has elapsed, and
    wherein, if the predetermined period of time for re-scanning the LB has elapsed, returning to searching the available frequency from the LB and repeating the following steps until an available frequency is detected.

2. The apparatus of claim 1, further comprising a frequency manager that updates and stores the LB when a frequency being used is modified.

3. A method for scanning a frequency in a mobile terminal, comprising the steps of
    (1) checking, by a frequency scanner, a Last-used frequency Band (LB) when a frequency-scanning event is generated;
    (2) searching for an available frequency from the LB;
    (3) if no available frequency is detected from the LB, sequentially selecting other frequency bands;
    (4) searching for an available frequency from the selected frequency bands;
    (5) if no available frequency is detected from the selected frequency bands, determining whether a predetermined period of time for re-scanning the LB has elapsed; and
    (6) if the predetermined period of time for re-scanning the LB has elapsed, returning back to step (2) and repeating steps (2) to (6) until an available frequency is detected.

4. The method of claim 3, further comprising, when a frequency being used is modified, prior to the generation of the frequency scan event, updating and storing the LB.

5. The method of claim 3, further comprising, if an available frequency is detected from the selected frequency bands in the step (4), updating the LB to a frequency band including the available frequency.

6. An apparatus for scanning a frequency in a mobile terminal, comprising:
- means for, when a frequency-scanning event is generated, checking a Last-used frequency Band (LB); and
- means for searching for an available frequency from the LB,
- wherein, if no available frequency is detected from the LB, sequentially selecting other frequency bands and searching for an available frequency from the selected frequency bands,
- wherein, if no available frequency is detected from the selected frequency bands, determining whether a predetermined period of time for re-scanning the LB has elapsed, and
- wherein, if the predetermined period of time for re-scanning the LB has elapsed, returning to searching for the available frequency from the LB and repeating the following steps until an available frequency is detected.

7. The apparatus of claim 6, further comprising, means for updating and storing the LB, when a frequency being used is modified.

8. A computer-readable recording medium having recorded thereon a program for scanning a frequency in a mobile terminal, comprising:
- a first code segment for, when a frequency-scanning event is generated, checking a Last-used frequency Band (LB);
- a second code segment for searching for an available frequency from the LB;
- a third code segment for, if no available frequency is detected from the LB, sequentially selecting other frequency bands;
- a fourth code segment for searching for the available frequency from the selected frequency bands; and
- a fifth code segment for determining whether a predetermined period of time for re-scanning the LB has elapsed,
- wherein, if the predetermined period of time for re-scanning the LB has elapsed, returning to the operation of the second code segment, and operations of the second to fifth code segments are repeated until the available frequency is detected.

* * * * *